(12) United States Patent
Eiffler et al.

(10) Patent No.: US 6,310,159 B1
(45) Date of Patent: Oct. 30, 2001

(54) LOW FOAMING PAPER SURFACE SIZING COMPOSITION

(75) Inventors: Jürgen Eiffler, Stade (DE); Roger Carlsson, Altendorf (CH); Jürgen Hermanns, Nottensdorf (DE); Stephen Oliver, Wollerau (CH)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/232,778

(22) Filed: Jan. 19, 1999

(30) Foreign Application Priority Data

Jan. 20, 1998 (EP) .................................. 98 100 881

(51) Int. Cl.$^7$ .................................................. C08F 222/04
(52) U.S. Cl. ...................... 526/272; 526/304; 526/311; 526/312; 526/318; 526/318.4; 526/318.41; 526/318.42; 526/320; 526/321; 526/323.2; 526/329.2; 526/333; 526/347
(58) Field of Search ..................... 526/272, 304, 526/311, 312, 318, 318.4, 318.41, 318.42, 320, 321, 323.2, 329.2, 333, 347

(56) References Cited

U.S. PATENT DOCUMENTS

| | | | |
|---|---|---|---|
| 3,755,071 | * | 8/1973 | Bey et al. .............................. 162/184 |
| 4,771,097 | * | 9/1988 | Sackmann et al .................... 524/549 |
| 4,997,414 | * | 3/1991 | Camara et al. ....................... 475/330 |
| 5,158,996 | * | 10/1992 | Valenti ..................................... 524/5 |
| 5,162,402 | * | 11/1992 | Ogawa et al. ........................... 524/5 |
| 5,358,566 | * | 10/1994 | Tanaka et al. ....................... 106/823 |
| 5,491,209 | * | 2/1996 | Helmer et al. ....................... 526/320 |
| 5,494,516 | * | 2/1996 | Drs et al. ............................. 106/819 |
| 5,612,396 | * | 3/1997 | Valenti et al. ........................... 524/5 |
| 5,798,425 | * | 8/1998 | Albrecht et al. ..................... 526/271 |

FOREIGN PATENT DOCUMENTS

| | | | |
|---|---|---|---|
| 349209 | * | 3/1979 | (AT) . |
| 19609789 | * | 9/1997 | (DE) . |
| 0320609 | * | 6/1989 | (EP) . |
| 0744417 | * | 11/1996 | (EP) . |
| 93/25593 | * | 12/1993 | (WO) . |
| 95/11341 | * | 4/1995 | (WO) . |
| 97/33927 | * | 9/1997 | (WO) . |

* cited by examiner

Primary Examiner—Helen L. Pezzuto

(57) ABSTRACT

The present invention refers to a paper surface sizing composition comprising a copolymer having:

a) structural units derived from ethylenically unsaturated hydrocarbons;
structural units derived from monomers selected from esters of ethylenically unsaturated mono-carboxylic acids, half-esters of ethylenically unsaturated dicarboxylic acids, allylethers and vinylethers and mixtures thereof; optionally c) structural units derived from ethylenically unsaturated monomers selected from monocarboxylic acids as well as salts and amides thereof, dicarboxylic acids as well as salts, amides and half-amides thereof, and cyclic anhydrides and imides of dicarboxylic acids and mixtures thereof; and optionally d) structural units derived from alkyl or amino-substituted alkyl acrylates or methacrylates with the proviso, that if no structural units c) are present, the structural units b) are derived from monomers selected from half esters of ethylenically unsaturated dicarboxylic acids.

14 Claims, No Drawings

LOW FOAMING PAPER SURFACE SIZING COMPOSITION

BACKGROUND OF THE INVENTION

The present invention refers to low foaming paper sizing compositions comprising a copolymer bearing specific hydrophobic substituents.

Sizing is a technique which renders paper resistant to the penetration of fluids. A paper may be sized to a variety of degrees and to a variety of purposes. Thus, writing paper is sized to prevent the spread of ink while milk carton stock is sized to prevent any fluid flow through the carton walls and edges.

Sizing can be applied to paper as either a post-production operation or as a portion of a paper making process itself. Surface size is applied to typically in the paper making process after the paper sheet has been formed and dried but not passed through a calendar stack.

Surface treatment is applied by paper makers for a variety of reasons all related in some way to improve quality control of the paper. The sizing effect translates into higher penetration time values and moreover correlates to less feathering and reduced lateral spread of printing inks producing improved imaging and contrast.

Anionic copolymers, i.e., α-olefin/unsaturated carboxylic acid-copolymers and in particular styrene/(meth)acrylic acid copolymers have been known for a long time as paper surface sizing agents, as described in DE-A-2117682, DE-A-233354713, DE-A-2421826 and DE-A-2502172.

The anionic styrene/(meth)acrylic acid and/or styrene maleic anhydride based copolymers are very hydrophilic. Hence, they are highly surface-active and, as a consequence, air is entrained into their solutions which then promotes the formation of foam in the paper making process. This results in an in homogeneous sizing. DE-A-3224528 discloses the use of polysiloxanes as additives for anionic surface sizing agents in order to reduce their foaming. Unfortunately these additives are not very stable in the aqueous polymer solution and separate into a second layer within a short time, often within weeks or even a couple of days. As a result their ability to reduce the foam level of the paper sizing composition is lost.

In EP-A-238968 also the problem of air entrainment in paper sizing compositions comprising copolymers based on maleic anhydride and diisobutylene is addressed. The solution suggested in EP-A-238968 to solve this problem is to provide a paper sizing composition comprising a copolymer of a vinyl monomer and maleic anhydride whereby 3 to 20 mole percent of the anhydride groups are bi-esterified with linear, branched or cyclic $C_1$–$C_{12}$ alcohols, the copolymer may also contain structural units derived from maleic esters, or half-esters esterified with the above-mentioned alcohols. Unfortunately the bi-esterification is a time-consuming process, for example, batch time of 12 hours and the presence of an acid catalyst in order to achieve a reasonable conversion and bi-esterification of the polymer is required rendering the production of this copolymer expensive.

DE-A-3742330 mentions among other advantages, a reduced foam level of the paper sizing compositions which comprises styrene/methacrylic acid copolymers containing as a third component, long-chain aliphatic methacrylates. However, preparation of long-chain aliphatic acrylates is not cost effective and yields insufficient reduction of the foam level of a paper sizing composition.

From WO 95/11341, the use of styrene/(meth)acrylic acid/half-esters of maleic anhydride are known. Maleic half-esters are esterified with alcohols having the following structure $CH_3$—$[(CH_2)_n$—$O]_m$—$(CH_2)_0$—OH. Particularly preferred is the half-ester of 2-(n-butoxy)ethyl alcohol. The copolymers are said to result in better sizing properties. A reduction of the foam level is not mentioned.

U.S. Pat. No. 5,237,024 discloses polymers of alkenyl aromatic monomers and alkyl half-esters of maleic anhydride with primary or secondary $C_1$–$C_{18}$ alcohols having a high weight average molecular weight of above 110,000 Daltons. The high molecular weight provides suitable film forming properties for paper sizing.

In view of the deficiencies of the prior art, an object of the present invention is to provide a paper sizing composition exhibiting low foaming without compromising paper sizing properties that can be easily produced at low costs. This object has been attained by a paper surface sizing composition comprising a copolymer having:

a) structural units derived from ethylenically unsaturated hydrocarbons;

b) structural units derived from monomers selected from esters of ethylenically unsaturated mono-carboxylic acids, half-esters of ethylenically unsaturated dicarboxylic acids, allylethers and vinylethers and mixtures thereof bearing a substituent R linked to the oxygen atom of either the ester groups or the ether groups that is at each occurrence selected from:

(i) polyalkyleneoxide groups corresponding to the formula:

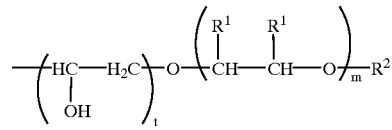

wherein $R^1$ is independently at each occurrence selected from hydrogen and $C_1$–$C_4$ alkyl, $R^2$ is $C_1$–$C_{44}$ hydrocarbyl, t is 0 or 1 and m is an integer in the range of 5–200 with the proviso that if $R^2$ is $C_1$–$C_5$ alkyl, the polyalkyleneoxide group does not contain more than 50 weight percent ethyleneoxide moieties based on the weight of the polyalkyleneoxide group; and (ii) groups corresponding to the formula:

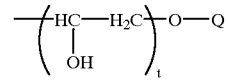

wherein t is 0 or 1 and Q is a polysiloxane residue, whereby the substituents R of said half-esters are additionally selected from (iii) $C_1$–$C_{24}$ alkyl, with the proviso that if R comprises $C_1$–$C_9$ alkyl, at least 1 mole percent of the substituents R of said half-esters are selected from substituents (i) and (ii); optionally c) structural units derived from ethylenically unsaturated monomers selected from mono-carboxylic acids as well as salts and amides thereof, dicarboxylic acids as well as salts, amides and half-amides thereof and cyclic anhydrides and imides of dicarboxylic acids and mixtures thereof; and optionally d) structural units derived from alkyl or amino-substituted alkyl acrylates of methacrylates with the proviso, that if no structural units c) are present, the structural units b) are derived from monomers selected from half-esters of ethylenically unsaturated dicarboxylic acids.

The paper sizing composition of the present invention combines satisfactory paper sizing properties hydrophobicity and printability with a low air entrainment due to incorporation of certain specified hydrophobic residues whereby these desired properties can already be achieved at a low level of incorporation of hydrophobic residues. Thus, the copolymers of the present invention are not only highly effective, but they can also be produced at considerably lower costs in comparison to the cited prior art products.

The copolymer of the present invention is composed of at least 2 different types of structural units as defined above.

The structural units a) preferably correspond to the Formula I:

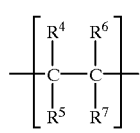
(I)

wherein $R^4$ is selected from $C_1$–$C_8$ alkyl and substituted and non-substituted aryl and $R^5$, $R^6$ and $R^7$ are independently at each occurrence selected from hydrogen and $C_1$–$C_4$ alkyl.

The selection of specific olefinic starting materials for the production of the copolymer is not critical. But for reasons of ease of production and availability of starting materials, styrene and diisobutylene are the preferred monomers used to provide for the structural units corresponding to Formula I. The most preferred olefinic monomer used in the preparation of the copolymer of the present invention is styrene.

The structural units b) of the copolymer of the present invention preferably correspond to the formulae:

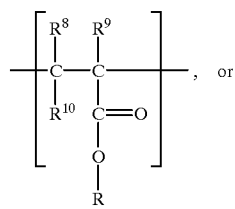
(II)

or

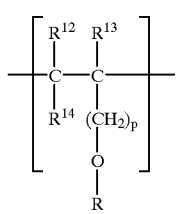
(III)

wherein $R^8$ and $R^9$ are independently at each occurrence selected from hydrogen and $C_1$–$C_4$ alkyl, $R^{10}$ is selected from hydrogen and C(O)X; X is independently at each occurrence selected from OA and $NR^{11}{}_2$, whereby A is selected from hydrogen, ammonium, alkyl ammonium, alkanol ammonium and $$\frac{1}{n \cdot Mn+}$$

whereby M is a metal having the valence n, and $R^{11}$ is selected from hydrogen, alkyl and aryl; p is 0 or 1, and $R^{12}$, $R^{13}$ and $R^4$ are independently at each occurrence selected from hydrogen and $C_1$–$C_4$ alkyl, and R is selected from:

(i) polyalkyleneoxide groups corresponding to the formula:

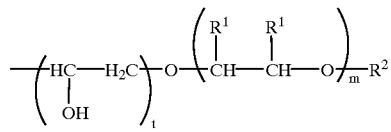

wherein $R^1$ is independently at each occurrence selected from hydrogen and $C_1$–$C_4$ alkyl, $R^2$ is $C_1$–$C_{44}$ hydrocarbyl, t is 0 or 1 and m is an integer in the range of 5 to 200, preferably 10 to 75, most preferably 15 to 50, with the proviso that if $R^2$ is $C_1$–$C_5$ alkyl, the polyalkyleneoxide group does not contain more than 50 weight percent ethyleneoxide moieties based on the weight of the polyalkyleneoxide chain; and (ii) groups corresponding to the formula:

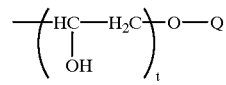

wherein t is 0 or 1 and Q is a polysiloxane residue.

In case the structural units b) are derived from half-esters of ethylenically unsaturated dicarboxylic acids, the substituents R of said half-esters are additionally selected from:

(iii) $C_1$–$C_{24}$ alkyl, with the proviso that if R comprises $C_1$–$C_9$ alkyl, at least 1 mole percent of the substituents R of said half-esters are selected from substituents (i) and (ii).

While structural units b) derived from vinylether monomers are suitable for the present invention, they have some disadvantages, e.g., vinylether components as defined above, tend to be susceptible to hydrolyzation in acidic environments which may occur especially in the copolymerization used for preparing the copolymers of the present invention, especially if unsaturated mono- or dicarboxylic acids are used for the polymerization. Thus, for ease of production it is preferred that the copolymer of the present invention is substantially free of units derived from vinylether monomers. Thus, according to a preferred embodiment of the present invention the structural units b) are derived from one monomer selected from:

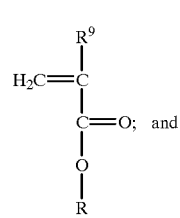
(IV)

and

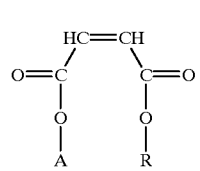
(V)

wherein $R^9$ is hydrogen or methyl and A and R are as defined above. Structural units b) derived from allylethers are equally suitable.

Particularly preferred are units derived from half-esters of maleic acid. In case the copolymer of the present invention does not include structural units c) the structural units b) are derived from half-esters of maleic acid.

It is especially crucial for the present invention to select appropriate substituents R for the structural units b). By selection of substituents, the comonomers of structural units b) are rendered them more hydrophobic, thereby reducing the surface-active properties of the copolymer and thus suppresses its level of foaming. These substituents R are desirably selected from:

(i) ethyleneoxide/propyleneoxide copolymer residues bearing a terminal $C_1$–$C_{24}$ alkyl group and containing no more than 50 weight percent ethyleneoxide units based on the weight of R;

(ii) polyethyleneoxide residues bearing a terminal $C_6$–$C_{35}$ alkyl moiety containing on an average not more than 10 ethyleneoxide units;

(iii) poly(propyleneoxide) residues bearing a terminal $C_1$–$C_{24}$ alkyl group;

(iv) poly(butyleneoxide) residues bearing a terminal $C_1$–$C_{24}$ alkyl group;

(v) butyleneoxide/propyleneoxide copolymer residues bearing a terminal $C_1$–$C_{24}$ alkyl group;

(vi) ethyleneoxide/butyleneoxide copolymer residues bearing a terminal $C_1$–$C_{24}$ alkyl group and containing no more than 50 weight percent ethyleneoxide units based on the weight of R;

(vii) ethyleneoxide/propyleneoxide/butyleneoxide terpolymer residues bearing a terminal $C_1$–$C_{24}$ alkyl group and containing no more than 50 weight percent ethyleneoxide units based on the weight of R; and (viii) polymer residues corresponding to the formula:

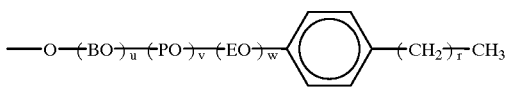

wherein EO, PO, and BO represent randomly arranged ethyleneoxide, propyleneoxide and butyleneoxide units respectively, u, v, and w are integers of 0 to 50, with the proviso, that no more than 50 weight percent ethyleneoxide units based on the weight of R are present and r is 0–35.

Substituent Q in the formula of R (ii) is selected from polysiloxane residues corresponding to the formula:

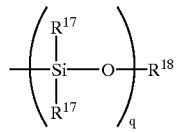

wherein $R^{17}$ is independently at each occurrence selected from $C_1$–$C_6$ alkyl, preferably methyl, $R^{18}$ is selected from $R^{17}$ and $SiR^{17}_3$ and q is an integer between 10 and 100.

Additionally the substituent R of structural units b) derived from half-ester of dicarboxylic acids, especially half-esters of maleic acid, may be selected from $C_1$–$C_{24}$ alkyl. Thereby it is important that if R comprises $C_1$–$C_9$ alkyl, at least one mole percent of the substituents R are selected from substituents R(i) and R(ii) as defined above. But it is preferred that the alkyl substituents replace only a fraction of substituents R(i) and R(ii) as defined above on the half-ester units, irrespective of the chain length of the alkyl group.

According to a preferred embodiment of the present invention if the structural units b) are derived from (meth) acrylic esters, then t in the Formulae (I) and (II) of substituent R as defined above is one. These monomers can be prepared by reacting glycidyl(meth)acrylate with an appropriate hydroxyl-functional polyalkyleneoxide or hydroxyl-functional polysiloxane. In the case of structural units b) derived from half-esters of ethylenically unsaturated dicarboxylic acids, allylethers and vinylethers, t in the Formulae (i) and (ii) of substituents R as defined above, is preferably zero.

Preferably the copolymers of the present invention are modified by incorporating long-chain polyalkyleneoxides which are known to be effective as defoamers. These compounds are preferably made from propyleneoxide or butyleneoxide by initiation with an alcohol, such as methanol, ethanol, butanol or a higher fatty alcohol or mixtures therefrom. Preferred are more hydrophobic alcohols such as butanol or higher fatty alcohols ($C_6$–$C_{24}$). Ethyleneoxides can also be used as a comonomer with propyleneoxide and/or butyleneoxide, however, its level is not higher than 50 weight percent in case initiation of the above-described reaction is made with a lower alcohol ($C_1$–$C_5$) since the polyalkyleneoxides would not be too hydrophilic. Examples of the polyalkyleneoxides used to modify the copolymers of the present invention are: SYNALOX™ 25-50B, SYNALOX 25-220B, SYNALOX 25-300B, SYNALOX 50-15B, SYNALOX 50-30B, SYNALOX 50-50B, SYNALOX 50-100B, SYNALOX 50-155B, SYNALOX 50-300B, TERRALOX™ OH28, TERRALOX OH32 and TERRALOX OA32. These are all ethyleneoxide/ propyleneoxide copolymers with a maximum content of ethyleneoxide units of 50 weight percent based on the weight of the polyalkyleneoxide, and are Trademarks of The Dow Chemical Company.

Suitably propyleneoxide polymers for modifying the copolymer of the present invention are the commercial products SYNALOX 100-20B, SYNALOX 100-30B, SYNALOX 100-50B, SYNALOX 100-85B, SYNALOX 100-120B, SYNALOX 100-150B, all Trademarks of The Dow Chemical and Dow Fine 1000 and DF-141, both trade names of The Dow Chemical Company.

Examples of butyleneoxide polymers suitable to modify the copolymer of the present invention are the commercial products SYNALOX OA15, SYNALOX OA25, SYNALOX OA60, SYNALOX OA90 and SYNALOX OA185 all Trademarks of The Dow Chemical Company.

Other suitable polyalkyleneoxides comprise polyethyleneoxides if the initiator is exclusively a higher fatty alcohol ($C_6$ and higher) and if the polyethyleneoxide chain contains on average not more than 10 ethyleneoxide units. Such compounds are available from The Dow Chemical Company under the Trademark TERRALOX WA-32 and WA-41.

Other preferred compounds that can be used to modify the copolymer of the present invention are represented by the formula:

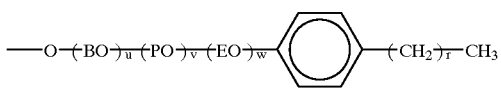

wherein EO, PO, BO represent randomly orientated ethyleneoxide, propyleneoxide and butyleneoxide units respectively, u, v, and w are integers of 0 to 50, with the proviso, that no more than 50 weight percent ethyleneoxide units based on the weight of the compound are present and r is 0 to 35.

Additionally the copolymer of the present invention may also contain structural units c) that preferably correspond to the formulae:

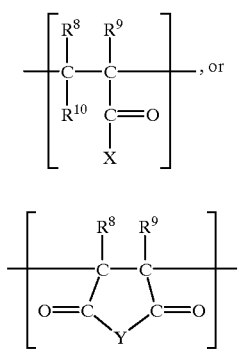

wherein $R^8$ and $R^9$ are independently at each occurrence selected from hydrogen and $C_1$–$C_4$ alkyl;

$R^{10}$ is selected from hydrogen and C(O)X;

X is independently at each occurrence selected from OA and $NR^{11}{}_2$, whereby A is selected from hydrogen, ammonium, alkyl ammonium, alkanol ammonium and $$\frac{1}{n \cdot Mn+}$$

whereby M is a metal having the valence n, and $R^{11}$ is selected from hydrogen, alkyl and aryl; and Y is selected from O and $NR^{11}$, whereby $R^{11}$ is defined as above.

The structural units c) of the copolymer of the present invention as defined above are derived from specific unsaturated mono-carboxylic acids and derivatives thereof. These derivatives are amides and salts of unsaturated mono-carboxylic acids. Alternatively, the structural units c) are derived from unsaturated dicarboxylic acids, salts, amides and half-amides thereof, as well as from cyclic anhydrides and imides of dicarboxylic acids.

Preferred countercations of anion units are the cations of the alkaline and earth alkaline metals as well as $Fe^{3+}$ and $Al^{3+}$ and ammonium, alkyl ammonium and alkanol ammonium cations.

Preferred units for the structural unit c) are derived from acrylic acid, methacrylic acid, maleic acid, and the salts thereof, as well as from maleic anhydride. Especially preferred are structural units derived from maleic acid and salts thereof, as well as from maleic anhydride whereby completely neutralized units derived from maleic acid are most preferred.

Furthermore, the copolymers of the present invention may additionally contain structural units d) derived from alkyl or amino-substituted alkyl acrylates or methacrylates that preferably correspond to the formula:

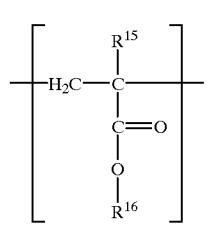

wherein $R^{15}$ is selected from hydrogen or methyl and $R^{16}$ is selected from $C_1$–$C_{12}$ alkyl or N,N-dialkyl aminoalkyl. Particularly preferred substituents $R^{16}$ are $C_1$–$C_4$ alkyl and N,N-dimethyl aminoethyl. These optional structural units d) may be included into the copolymer to provide up to 10 mole percent of the structural units of the copolymer. But preferably the copolymer is essentially free of these structural units.

According to a preferred embodiment of the present invention the paper sizing composition comprises a copolymer having structural units a), b) and c) and optionally d), as defined above also in their preferred embodiments. Thus, the copolymer of this embodiment corresponds to the Formula (IX):

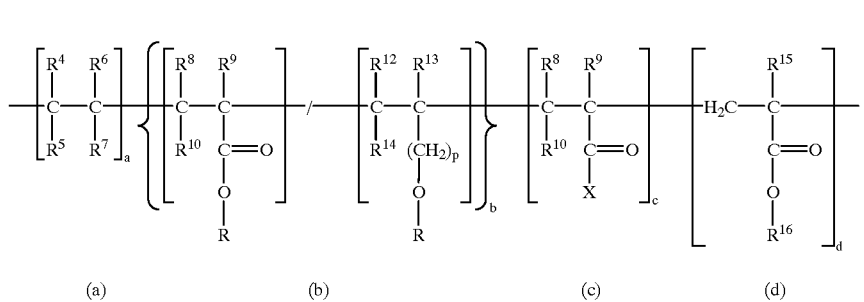

wherein the structural units a), b), c) and d) are randomly arranged and the substituents $R^{4-14}$, R and X have the meaning as defined above. The substituents R linked to the oxygen atom of either the ester or ether groups of structural unit b) are preferably selected from substituents R(i) and R(ii) as defined above.

The molar ratio of units a) to the sum of units b)+c) of the copolymer of this embodiment is preferably in the range of 10:1 to 1:10, more preferred in the range of 3:1 to 1:3 and most preferred in the range of 2:1 to 1:2. The molar ratio of units c) to units b) is preferably in the range of 1000:1 to 1:10, more preferred in the range 15 of 500:1 to 5:1, and most preferred 200:1 to 10:1. Surprisingly the inventors of the present invention discovered that a relatively low amount of structural units b) in comparison to structural units c) is sufficient to solve the problem of air entrainment in the paper sizing composition. As a consequence of a need to incorporate a comparatively small amount of component b, the production costs of the copolymers of the present invention are considerably lower than the cost of the cited prior art. The copolymers wherein the molar ratio of units c) to units b) is above 10:1 are especially preferred. The structural unit d) may constitute up to 10 mole percent of the sum of all structural units in the copolymer, but a copolymer without structural units d) is preferred.

According to another preferred embodiment of the present invention the paper sizing composition comprises a copolymer corresponding to the Formula (X):

of 100:1 to 1:100, more preferred in the range of 10:1 to 1:10 and most preferred in the range of 10:1 to 1:1.

According to another less preferred embodiment of the present invention the paper sizing composition comprises a copolymer corresponding to the Formula (X) as defined above, whereby b(y) is zero and R(x) is selected from $C_{10}$–$C_{24}$ alkyl, having 30 to 50 mole percent structural units a); 5 to 20 mole percent structural units b) (=b(x)+b(y)); 25 to 55 mole percent structural units c); 0 to 10 mole percent structural units d) based on all structural units of the copolymer.

Referring to another embodiment of the present invention the paper sizing composition comprises a opolymer corresponding to the Formula (XI):

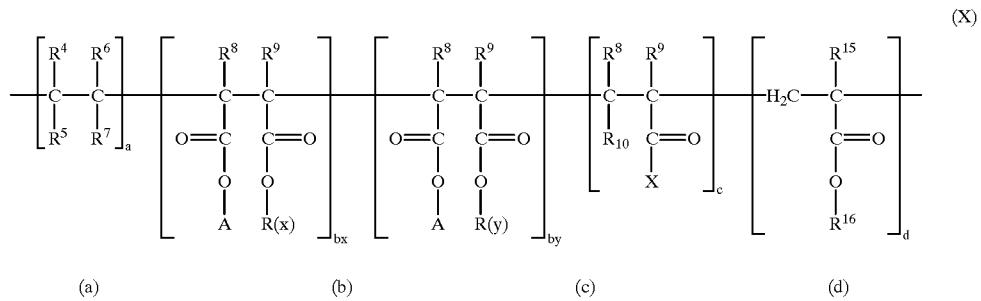

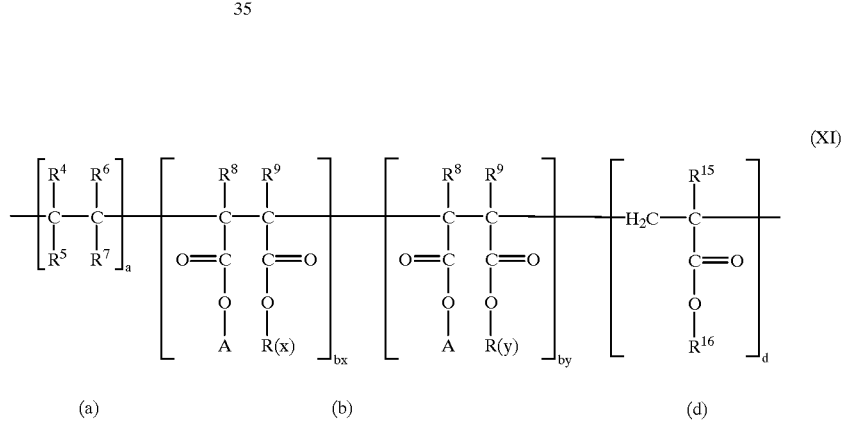

wherein the structural units a), b), c) and d) are randomly arranged and the substituents $R^{4-16}$, A and X have the meaning as defined above also including the preferred embodiments, R(x) is selected from $C_1$–$C_{24}$ alkyl and R(y) is selected from substituents R(i) and R(ii) as defined above.

Preferably the copolymer of this embodiment comprises 30 to 50 mole percent structural units a), 5 to 20 mole percent structural units b), 25 to 55 mole percent structural units c); 0 to 10 mole percent structural units d) based on all structural units of the copolymer.

The molar ratio of substituents R(x) to substituents R(y) or in other words the ratio b(x)/b(y) is preferably in the range wherein the structural units a), b) and d) are randomly arranged and the substituents $R^{4-16}$, A and X have the meaning as defined above also including the preferred embodiments, R(x) is selected from $C_1$–$C_{24}$ alkyl and R(y) is selected from substituents R(i) and R(ii) as defined above.

The molar ratio of substituents R(x) to substituents R(y) is preferably in the range of 100:1 to 1:100, more preferred in the range of 10:1 to 1:10 and most preferred in the range of 10:1 to 1:1. Moreover, the molar ratio of structural units a) to structural units b) (+b(x)+b(y)) is in the range of 2:1 to 1:2, preferably 1.4:1 to 1:1 and the structural units d) is 0 to 10 mole percent of the structural units of the copolymer.

According to a preferred alternative to that embodiment the structural units b) do not contain substituents selected from $C_1$–$C_{24}$ alkyl. Thus, b(x) in Formula (XI) is zero for this alternative.

According to another aspect, the present invention refers to a copolymer comprising:

a) structural units derived from ethylenically unsaturated hydrocarbons;

b) structural units derived from half-esters of an ethylenically unsaturated dicarboxylic acid bearing x) substituents R linked to the oxygen atoms of the ester group selected from $C_1$–$C_{24}$ alkyl; and y) substituents R linked to the oxygen atom of the ester group selected from (i) polyalkyleneoxide groups corresponding to the formula:

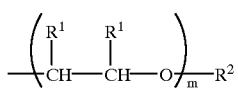

wherein $R^1$ is independently at each occurrence selected from hydrogen and $C_1$–$C_4$ alkyl, $R^2$ is $C_1$–$C_{44}$ hydrocarbyl and m is an integer in the range of 5 to 200, with the proviso that if $R^2$ is $C_1$–$C_5$ alkyl the polyalkyleneoxide group does not contain more than 50 weight percent ethyleneoxide moieties based on the weight of the polyalkyleneoxide chain; and (ii) polysiloxane groups; whereby the molar ratio of substituents R(x) to substituents R(y) is in the range of 100:1 to 1:100, preferably 10:1 to 1:10 and more preferred 10:1 to 1:1; optionally c) structural units derived from ethylenically unsaturated monomers selected from monocarboxylic acids as well as salts and amides thereof, dicarboxylic acids as well as salts, amides and half-amides thereof and cyclic anhydrides and imides of dicarboxylic acids and mixtures thereof; and optionally d) structural units derived from alkyl or amino-substituted alkyl acrylates or methacrylates.

Preferably the copolymer comprises 30 to 50 mole percent structural units a), 5 to 20 mole percent structural units b), 25 to 55 mole percent structural units c), and 0 to 10 mole percent structural units d), based on the total number of structural units in the copolymer. According to an alternative embodiment the copolymer does not contain structural units c) and therefore comprises 25 to 75 mole percent structural units a), 75 to 25 mole percent structural units b), and 0 to 10 mole percent structural units d) based on the total number of structural units in the copolymer. Preferably the molar ratio of units a) to units b) is 2:1 to 1:2, more preferred 1:1 to 1.4:1.

The structural units a) of the copolymer of the present invention are preferably derived from monomers selected from styrene and diisobutylene. The structural units b) are preferably derived from half-esters of maleic acids and salts thereof, and the structural units c) are preferably derived from monomers selected from acrylic acid, methacrylic acid, maleic acid, and salts thereof. The substituents R(y) linked to the oxygen atom of the ester group are preferably selected from substituents R(i), as defined above in more detail.

These copolymers are especially suitable as surface sizing agents that can be used in paper sizing compositions according to the present invention.

All copolymers as described herein have preferably a weight average molecular weight of 5000 to 100,000, more preferred of 10,000 to 60,000 and most preferred of 20,000 to 40,000.

The paper sizing composition of the present invention is preferably in an aqueous solution or dispersion of any of the copolymers described herein whereby the copolymer is preferably present in an amount 15 of 0.0005 to 15 weight percent, preferably 0.01 to 7.5 weight percent, more preferably 0.05 to 5 weight percent based on the total weight of the composition.

The low foaming paper surface sizing composition according to the present invention may additionally comprise pigments and/or starch. If pigmented compositions are used, preferably clay, $CaCO_3$ and/or $TiO_2$ is selected as pigments. Alternatively the sizing composition of the present invention can be used in coatings, particularly in paper coatings.

The copolymers of the present invention can be prepared by copolymerization of monomers that provide for the structural units a), b) and optional structural units c) and d) as defined above utilizing polymerization methods that are well known to the person skilled in the art. Thus, it is preferred to introduce structural units b) as defined above into the copolymer of the present invention by copolymerizing esters of ethylenically unsaturated monocarboxylic acids, half-esters of ethylenically unsaturated dicarboxylic acids, allylethers or vinylethers already bearing the substituent R as defined above with other monomers providing for the units a) and the optional units in the appropriate relative amounts. By subsequent neutralization with caustic the carboxylic groups in the copolymer may convert into the salt form if desired.

Copolymers corresponding to Formula (X) as previously defined, are preferably prepared as follows.

In case the half-ester of a dicarboxylic acid, e.g., maleic acid is utilized to provide for structural units b) the half-ester formation can be achieved by the reaction of maleic anhydride with an alcohol providing for the substituent R as defined above, e.g., a hydrophobic polyalkyleneoxide by dissolving/dispersing maleic anhydride in the polyalkyleneoxide. The reaction temperature is in the range of 50° C. to 200° C., preferably in the range of 70° C. to 170° C. and most preferably 90° C. to 150° C. The reaction time depends on the temperatures and is generally between 0.5 to 8 hours to completion of the reaction.

If maleic acid is selected as an unsaturated carboxylic acid monomer, it is preferably used and prepared in situ by hydrolyzing maleic anhydride. This can occur by adding water in appropriate ratios to the polyalkyleneoxide. However, the simultaneous half-ester formation and hydrolysis of maleic anhydride is less preferred.

Preferred is the conversion using two steps. First by preparing the half-ester using maleic anhydride in excess (molar ratio of maleic anhydride to olyalkyleneoxide of at least 1:1 to 100:1). In a subsequent step, additional maleic anhydride is added to provide for the appropriate ratio of structural units b) to units c) in the final copolymer. Thereafter, maleic acid is hydrolyzed to the desired extent by adding the appropriate amount of water. Water may be present in excess and can be used together with isopropanol.

Still another method is to begin the half-ester and hydrolysis of maleic anhydride separately, and to combine both solutions prior to the polymerization with the olefinic monomer, e.g., styrene. Polymerization is carried out according to known procedures, see for instance U.S. Pat. No. 5,138,004.

Preferred is, however, a method, where styrene and the initiator is continuously added in a concentrated solution of maleic acid containing the half-ester as described above. Preferably if acrylic acid or methacrylic acid is used it is added together or separately with the styrene stream and the initiator stream into the reaction solution containing the lower alcohol/water mixture and the half-ester. The half-ester can, however, also be added as a fourth, separate component to the reaction mixture or dissolved in the styrene or (meth)acrylic acid stream. The continuous feed of the monomer streams into the reaction mixture guarantees low monomer concentrations and therefore, low molecular weight. Chain transfer agents such as dodecylmercaptan can be used to control the molecular weight. Preferred initiators are peroxo-compounds such as peroxodisulfates or hydrogen peroxide which can be employed in combination with a peroxide decomposer such as ferric salts or a sulfite or an amine in order to accelerate its decomposition. But instead of peroxides, also organic initiators such as azodiisobutyronitrile and the like can be used. A particular feature of the process described above is that the solvent, lower alcohol like isopropanol can be recycled and reused for subsequent reactions.

The same is valid if a (meth)acrylate of a hydroxy-functional compound providing for the hydrophobic substituent R of the present invention is used instead of the half-ester. The (meth)acrylates are produced in a separate, independent step, e.g., by esterification of (meth)acrylic acid or reaction of (meth)acryloyl chloride with the appropriate hydroxy-functional compound.

If vinylethers or allylethers bearing the hydrophobic substituent of the present invention are used, the unsaturated carboxylic acid such as maleic acid is neutralized and polymerized under neutral pH conditions or slightly alkaline conditions in its salt-form with styrene, because the vinylethers are unstable under acidic conditions.

Alternatively, but less preferred, the substituents R may be introduced into the copolymer after copolymerization by subsequent esterification of carboxylic acid groups, anhydride groups or carboxylate groups in the copolymer with an appropriate amount of hydroxyl-functional compounds of the substituents R as defined above to provide for the desired ratio of structural units b) to structural units c). For example, as disclosed in JP-A 84-62137, styrene can be polymerized with maleic anhydride, for instance, using methyl isobutyl ketone or o-xylol as solvent and the final copolymer can be converted with the hydroxyl-functional compounds providing for the hydrophobic substituent R. The half-ester formation and the hydrolysis is preferably carried out in two independent steps. Following this route, the polymer usually contains residual, non-reacted maleic anhydride groups.

Copolymers according to Formula (X) of the present invention may be prepared as follows.

The formation of the mixed half-ester can be achieved by the reaction of maleic anhydride first with an alcohol providing for the substituents R(y) as previously defined, e.g., a hydrophobic polyalkyleneoxide by dissolving/dispersing maleic anhydride in the polyalkyleneoxide. The reaction temperature is in the range of 50° C. to 200° C., preferably in the range of 70° C. to 170° C. and most preferably 80° C. to 150° C. The reaction time depends on the temperatures and is generally between 0.5 to 8 hours to completion of the reaction. Thereafter, an alcohol providing for the alkyl group R(x) is added to the reaction mixture in excess and the reaction is continued until completion. Copolymerization with, e.g., styrene and (meth)acrylic acid, is carried out using well known polymerization methods, e.g., as previously described.

The invention is further illustrated by the following Examples which should not be construed to limit the scope of the present invention. Unless stated otherwise, all parts and percentages are given by weight.

EXAMPLE 1

A polymer resin according to the present invention (Formula (X)) is prepared from 43.3 mole percent styrene, 44.3 mole percent (meth)acrylic acid, and 12.4 mole percent of a mixed half-ester from maleic anhydride with isopropanol (x) and a hydrophobic polyalkyleneoxide (y) (SYNALOX 100-150B). The mole ratio of R(x):R(y) is 62.7.

A reactor was purged with nitrogen. 25 g of maleic anhydride (0.255 mole) was brought into the reactor. 11.2 g SYNALOX 100-150B produced from butanol and propyleneoxide having a molecular weight of 2600 was added and reacted for 0.5 hours at 80° C. The temperature was then increased to 110° C. and kept for 0.5 hours in order to complete the reaction. The solution was then allowed to cool to 80° C. and 90 g of isopropanol were added. The mixture was heated for 1.5 hours at 80° C. The excess of isopropanol was used as a solvent for the subsequent copolymerization.

93.4 g of styrene (0.89 moles) and 99 g of an 80 weight percent aqueous solution of (meth)acrylic acid (0.91 moles) were added together with 16.5 g of isopropanol. Then 8.7 g of 2,2-azobis(2-methylbutyronitrile) dispersed in 55 mL of water were added. The reaction mixture was stirred at 220 rpm and heated to 80° C. The temperature was kept for 4 hours at 80° C. to 85° C. Thereafter, 430 mL of water were added and the mixture was allowed to cool. 95.5 mL of a 25 weight percent aqueous ammonium solution was added and the mixture was stirred for one hour until the polymer was completely dissolved. The aqueous polymer solution was diluted to 15 weight percent non-volatiles resulting in a Brookfield-viscosity measured at 25° C. of 210 cps. The pH was 9.0.

COMPARATIVE EXAMPLE 1

25 g of maleic anhydride were reacted with isopropanol only at 80° C. for 2 hours. The copolymerization of the half-ester with styrene and (meth)acrylic acid was carried out as described above in Example 1, using the same weight and mole levels. The solution was diluted to 15 weight percent non-volatiles resulting in a Brookfield-viscosity at 25° C. of 435 cps.

COMPARATIVE EXAMPLE 1a

To the aqueous polymer solution of Comparative Example 1, one weight percent SYNALOX 100-150B was added.

EXAMPLE 2

A copolymer according to the present invention (Formula (X)) composed of 39 mole percent styrene, 48.9 mole percent (meth)acrylic acid, 10.8 mole percent of maleic acid and about 0.37 mole percent of a half-ester from maleic anhydride with SYNALOX 100-150B was prepared. This composition correlates to a mole ratio of structural units a) to the sum of structural units b)+c) of 0.65 and. a mole ratio of structural units c) to structural units b) of 161.7.

13.7 g (0.14 moles) of maleic anhydride were reacted with 12 g of SYNALOX 100-150B (0.0046 moles) for 1 hour at 140° C. A mixture of isopropanol/water was thereafter added. The half-ester was copolymerized with 51.1 g (0.49 moles) styrene, and 52.4 g (0.609 moles) (meth)acrylic acid, and 2.86 g of ammonium peroxodisulfate according to a method as described in U.S. Pat. No. 5,138,004, and converted with 35 weight percent ammonia solution into its salt form. The polymer solution was diluted to 15 weight percent non-volatiles resulting in a Brookfield-viscosity at 25° C. of 650 cps.

COMPARATIVE EXAMPLE 2

A 15 weight percent aqueous polymer solution was prepared in accordance with the method of Example 2 but without the half-ester of maleic anhydride with Synalox 100-150B.

EXAMPLE 3

A polymer according to the present invention (Formula (X)) composed of 44.1 mole percent styrene (a), 1.25 mole percent of an acrylate prepared from Dow Fine 1000 with acryloyl chloride (b), 54.6 moles percent of (meth)acrylic acid (c). This correlates with a mole ratio of structural units a) to the sum of structural units b)+c) of 0.79 and a mole ratio of structural units c) to structural units b) of 43.5.

50 g of Dow Fine 1000 (produced from a $C_{10}$–$C_{12}$ fatty alcohol and propyleneoxide having a molecular weight of 1000) was heated to 45° C. in a reactor. 6 g of acryloyl chloride were added within 10 minutes using a dropping funnel. 0.25 g of a 25 weight percent ammonia solution was added. This mixture was stirred for 3 hours at 45° C.

15 g of the above solution were dissolved in 51.2 g of styrene and polymerized with 52.4 g of (meth)acrylic acid using 2.7 g of ammonium peroxodisulfate according to the method used in Example 2 and converted with 25 weight percent ammonia solution into its salt form. The white-viscous emulsion obtained was diluted with water to a non-volatile content of 15 weight percent, resulting in a Brookfield-viscosity of 1600 cps.

COMPARATIVE EXAMPLE 3

A copolymer composed of 48.1 mole percent styrene, 48.1 mole percent maleic acid structural units and 3.8 mole percent of structural units derived from dodecylester of (meth)acrylic acid was prepared in accordance with the method of Example 3, adjusted with aqueous caustic to a pH of 7.1, and the emulsion was diluted to 15 weight percent non-volatiles.

EXAMPLE 4

The method as described in Example 3 was repeated, however, only 10 g of the acrylate prepared from acryloyl chloride with Dow Fine 1000 was polymerized with 51.2 g of styrene and 52.4 g of (meth)acrylic acid. Resulting in a copolymer composed of 44.2 mole percent styrenic units, 54.8 mole percent methacrylic acid units, and 0.9 mole percent of the acrylate prepared from acryloyl chloride and Dow Fine 1000. The white dispersion was diluted with water to a non-volatile content of 15 weight percent having a Brookfield-viscosity of 380 cps and a pH of 9.2.

EXAMPLE 5

A polymer containing a hydrophobic half-ester produced from maleic anhydride with decan-1-ol was prepared.

25 g of maleic anhydride were reacted with 40.4 g of decan-1-ol at 82° C. for one hour. 85 g of isopropanol were added and the polymerization was carried out as described in Example 1 with 93.4 g styrene, 99 g of an 80 weight percent aqueous solution of (meth)acrylic acid, and 8.7 g of 2,2-azobis(2-methylbutyronitrile) with 55 mL of water. The work-up procedure was carried out as described in Example 1. After treatment with a 25 weight percent aqueous ammonia solution, the polymer was diluted to a non-volatile content of 15 weight percent resulting in a pH of 9.2 and a Brookfield-viscosity at 25° C. of 975 cps.

From the above copolymer compositions, paper surface sizing compositions were prepared by adding the copolymer composition of each example to a potato starch solution, at 8 percent solids in an amount to provide for 6 weight percent dry polymer-based on dry starch in the starch solution. The examples are not restricted to the use of potato starch, instead maize starch can be used at the same or comparative levels.

The resultant paper surface sizing compositions were tested for foam volume using the pump test as described below.

300 mL of each paper surface sizing composition was filled into a 2000 mL measuring cylinder placed in a thermostated water bath at 60° C. A gear pump circulated the solution at a rate of 3 L per minute through a nozzle sucking air into the solution by the vacuum generated by the solution pumped through the nozzle. After passing the nozzle, the solution dropped from the top of the measuring cylinder onto the surface. The total volume (liquid and foam) was measured after 30 minutes. The foam volume is the difference between total volume and the initial volume of 300 mL unfoamed sizing composition and is reported for each paper surface sizing composition in Table I.

TABLE I

| Example | Foam volume [ml] | Cobb-value [g/m²] | Pick-up [g/m²] | Emco-value [g/m²] |
|---|---|---|---|---|
| 1 | 300 | 20.5 | 2.5 | 814 |
| Comp. 1 | 710 | 21.5 | 2.3 | 822 |
| Comp. 1a | 340 | — | — | — |
| 2 | 305 | 21.0 | 2.4 | 670 |
| Comp. 2 | 750 | — | — | — |
| 3 | 170 | 20.8 | 2.4 | 592 |
| Comp. 3 | 600 | — | — | — |
| 4 | 180 | 20.1 | 2.4 | 680 |
| 5 | 220 | 20.1 | 2.4 | 916 |

EXAMPLE 6

A glass reactor was purged with nitrogen. 10 g Fine 1000 were brought into the reactor and ently, upon stirring, 1.4 mL of glycidylmethacrylate (GMA), 0.006 g of $H_3PO_4$ and 0.006 g of 2,6-di-tert.-butyl-4-methylphenol. The mixture was to 80° C. and maintained at this temperature for 1.5 hour. The mixture remained clear and transparent. Complete conversion and a new strong ether band at 1120 cm(−1) could be recorded and detected by IR-spectroscopy (solution A). This reaction product was copolymerized with 52.4 g of methacrylic acid and 51.6 g of styrene and 2.70 g ammonium peroxodisulfate according to a method as described in U.S. Pat. No. 5,128,004. The mixture was converted with 45 g of 2.5 weight percent ammonia solution into its salt form. The polymer was then diluted to 15 weight percent non-volatiles content resulting in a Brookfield viscosity of 210 cps at 25° C. pH was 9.1. The solution was clear and transparent. The foam volume (measured as described) after 30 minutes was 280 mm.

What is claimed is:

1. A paper surface sizing composition comprising a copolymer having:
    a) structural units derived from styrene;
    b) structural units derived from monomers selected from esters of ethylenically unsaturated mono-carboxylic acids, half-esters of ethylenically unsaturated dicarboxylic acids and mixtures thereof bearing a substituent R linked to the oxygen atom of the ester groups that is at each occurrence selected from:

(i) polyalkyleneoxide groups corresponding to the formula:

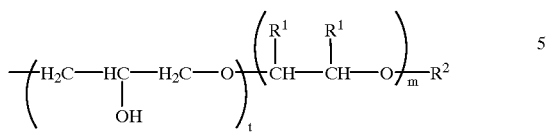

wherein $R^1$ is independently at each occurrence selected from hydrogen and $C_1$–$C_4$ alkyl, $R^2$ is $C_1$–$C_{44}$ hydrocarbyl, t is 0 or 1 and m is an integer in the range of 5 to 200, with the proviso that if $R^2$ is $C_1$–$C_5$ alkyl the polyalkyleneoxide group does not contain more than 50 weight percent ethyleneoxide moieties based on the weight of the polyalkyleneoxide group;

c) structural units derived from ethylenically unsaturated monomers selected from acrylic acid, methacrylic acid, maleic acid, the salts thereof, maleic anhydride and mixtures thereof; and optionally d) structural units derived from alkyl substituted alkyl acrylates or methacrylates.

2. The paper sizing composition of claim 1, whereby the structural units b) correspond to the formulae:

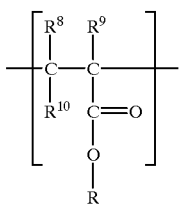

(II)

wherein $R^8$ and $R^9$ are independently at each occurrence selected from hydrogen and $C_1$–$C_4$ alkyl;

$R^{10}$ is selected from hydrogen and C(O)X; and

X is independently at each occurrence selected from OA and $NR^{11}_2$, whereby A is selected from hydrogen, ammonium, alkyl ammonium, alkanol ammonium and $$\frac{1}{n \cdot Mn+},$$

whereby M is a metal having the valence n, and $R^{11}$ is selected from hydrogen, alkyl and aryl.

3. The paper sizing composition of any of the preceding claims comprising a copolymer having structural units a), b), c) and optionally d), whereby the molar ratio of units a) to the sum of units b) and c) is in the range of 10:1 to 1:10, the molar ratio of units c) to units b) is in the range of 1000:1 to 1:10 and units d) if present represent less than 10 mole percent of all structural units in the copolymer.

4. The paper sizing composition of claim 1 comprising a copolymer having structural units a); and structural units b) that are derived from half-ester of an ethylenically unsaturated dicarboxylic acid bearing substituents R linked to the oxygen atom of the ester group selected from (i) as defined in claim 1; and 0 to 10 mole percent based on the total number of structural units in the copolymer of structural units d), whereby the molar ratio of structural units a) to structural units b) is in the range of 2:1 to 1:2.

5. The paper sizing composition of claim 1, wherein the structural units b) are derived from monomers selected from:

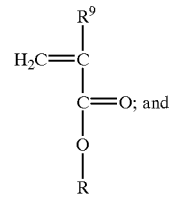

(VII)

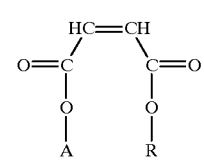

(VIII)

wherein $R^9$ is hydrogen or methyl and A and R are as defined above.

6. The paper sizing composition of claim 1, wherein R(i) is selected from:

(i) ethyleneoxide/propyleneoxide copolymer residues bearing a terminal $C_1$–$C_{24}$ alkyl group and containing no more than 50 weight percent ethyleneoxide units based on the weight of R;

(ii) polyethyleneoxide residues bearing a terminal $C_6$–$C_{35}$ alkyl moiety containing on an average not more than 10 ethyleneoxide units;

(iii) poly(propyleneoxide) residues bearing a terminal $C_1$–$C_{24}$ alkyl group;

(iv) poly(butyleneoxide) residues bearing a terminal $C_1$–$C_{24}$ alkyl group;

(v) butyleneoxide/propyleneoxide copolymer residues bearing a terminal $C_1$–$C_{24}$ alkyl group;

(vi) ethyleneoxide/butyleneoxide copolymer residues bearing a terminal $C_1$–$C_{24}$ alkyl group and containing no more than 50 weight percent ethyleneoxide units based on the weight of R;

(vii) ethyleneoxide/propyleneoxide/butyleneoxide terpolymer residues bearing a terminal $C_1$–$C_{24}$ alkyl group containing no more than 50 weight percent ethyleneoxide units based on the weight of R; and (viii) polymer residues corresponding to the formula:

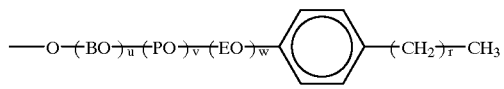

wherein EO, PO, and BO represent randomly orientated ethyleneoxide, propyleneoxide and butyleneoxide units respectively, u, v, and w are integers of 0 to 50, with the proviso, that no more than 50 weight percent ethyleneoxide units based on the weight of R are present and r is 0 to 35.

7. The paper sizing composition of claim 1, wherein R has a weight average molecular weight of from 100 to 10,000.

8. The paper sizing composition of claim 1, wherein the weight average molecular weight of the copolymer is from 5,000 to 100,000.

9. The paper sizing composition of claim 1, whereby the composition is an aqueous solution or dispersion of the copolymer.

10. The paper sizing composition of claim 1, whereby the copolymer is present in an amount of from 0.0005 to 15 weight percent on the total weight of the composition.

11. The paper sizing composition of claim 1 comprising a copolymer having structural units a), b), c) and optionally d), whereby the molar ratio of units a) to the sum of units b) and c) is in the range of 2:1 to 1:2 and the molar ratio of units c) to units b) is in the range of 200:1 to 10:1.

12. The paper sizing composition of claim 1, wherein R has a weight average molecular weight of from 500 to 5,000.

13. The paper sizing composition of claim 1, wherein the weight average molecular weight of the copolymer is from 20,000 to 40,000.

14. The paper sizing composition of claim 1 comprising a copolymer having structural units a); and structural units b) that are derived from half-ester of an ethylenically unsaturated dicarboxylic acid bearing substituents R linked to the oxygen atom of the ester group selected from (i) as defined in claim 1; and 0 to 10 mole percent based on the total number of structural units in the copolymer of structural units d), whereby the molar ratio of structural units a) to units b) is in the range of 1.4:1 to 1:1.

* * * * *